US012782256B2

(12) United States Patent
Wang et al.

(10) Patent No.: US 12,782,256 B2
(45) Date of Patent: Nov. 3, 2026

(54) SURFACE DENSITY DEVICE CALIBRATION APPARATUS AND SURFACE DENSITY DEVICE CALIBRATION METHOD

(71) Applicant: CONTEMPORARY AMPEREX TECHNOLOGY (HONG KONG) LIMITED, Hong Kong (CN)

(72) Inventors: Qiangjun Wang, Ningde (CN); Jingdong Zhang, Ningde (CN); Zhihui Zhen, Ningde (CN); Bingyang Zhan, Ningde (CN); Weigang Chen, Ningde (CN); Qian Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 256 days.

(21) Appl. No.: 18/462,633

(22) Filed: Sep. 7, 2023

(65) Prior Publication Data

US 2024/0167928 A1 May 23, 2024

Related U.S. Application Data

(63) Continuation of application No. PCT/CN2023/096647, filed on May 26, 2023.

(30) Foreign Application Priority Data

Nov. 18, 2022 (CN) ........................ 202211446727.3

(51) Int. Cl.
*G01N 9/24* (2006.01)

(52) U.S. Cl.
CPC ..................................... *G01N 9/24* (2013.01)

(58) Field of Classification Search
CPC ............... G01N 9/24; G01N 35/00693; G01N 2035/00702; G01N 9/00;

(Continued)

(56) References Cited

U.S. PATENT DOCUMENTS 4,899,298 A 2/1990 Overhoff
5,565,678 A * 10/1996 Manian .................. A61B 6/583
378/207

FOREIGN PATENT DOCUMENTS

CA 2083533 A1 8/1992
CN 102944498 A * 2/2013 ........ H01M 10/4285

(Continued)

OTHER PUBLICATIONS

International Search Report for International Application PCT/CN2023/096647, dated Sep. 11, 2023.

(Continued)

*Primary Examiner* — Robert R Raevis
(74) *Attorney, Agent, or Firm* — Ladas & Parry LLP

(57) ABSTRACT

Method and apparatus for calibrating a surface density measurement device are provided, and relate to the field of battery testing devices. The apparatus for calibrating the surface density measurement device calibration apparatus includes a mounting bracket, a standard member, and an adjusting member. The mounting bracket is configured for mounting the surface density measurement device. The standard member includes multiple standard zones with different densities. The adjusting member connects the standard member and the mounting bracket, and the adjusting member is configured to adjust positions of the multiple standard zones such that the multiple standard zones move one by one to a testing position of the surface density measurement device. The standard member is used instead of an electrode plate for calibrating the surface density measurement device, which reduces the production time of the electrode plate, and improves the calibration efficiency of the surface density measurement device.

9 Claims, 6 Drawing Sheets

(58) Field of Classification Search
CPC ........... G01N 2001/2893; G01N 29/30; Y02E 60/10; H01M 6/50; H01M 10/42
USPC .................... 73/1.01, 1.86, 32 R; 356/243.1; 250/252.1, 339.09, 341.5, 358.1, 363.09, 250/390.06, 559.1
See application file for complete search history.

(56) References Cited

FOREIGN PATENT DOCUMENTS

| | | | | | |
|---|---|---|---|---|---|
| CN | 208780581 | U | | 4/2019 | |
| CN | 110031359 | A | | 7/2019 | |
| CN | 209868378 | U | | 12/2019 | |
| CN | 211553812 | U | | 9/2020 | |
| CN | 215297182 | U | | 12/2021 | |
| CN | 114720324 | A | | 7/2022 | |
| CN | 115096756 | A | | 9/2022 | |
| CN | 217385093 | U | | 9/2022 | |
| CN | 115305526 | A | | 11/2022 | |
| CN | 115931634 | A | | 4/2023 | |
| EP | 0526629 | A1 | | 2/1993 | |
| GB | 2054841 | A | | 2/1981 | |
| JP | 2007531890 | A | * | 11/2007 | ............... G01N 9/24 |
| WO | WO-2014002677 | A1 | * | 1/2014 | ....... G01N 35/00623 |
| WO | WO-2016038391 | A1 | * | 3/2016 | ......... G01N 33/2823 |

OTHER PUBLICATIONS

Written Opinion of International Search Authority for International Application PCT/CN2023/096647, dated Sep. 11, 2023.
Extended European Search Report for EP application No. 23789475.3, dated Sep. 17, 2024.
Notification of grant patent right for invention, CN application No. 202211446727.3, dated Jun. 30, 2025.

* cited by examiner

SURFACE DENSITY DEVICE CALIBRATION APPARATUS AND SURFACE DENSITY DEVICE CALIBRATION METHOD

CROSS-REFERENCE TO RELATED APPLICATIONS

This application is a continuation of International Patent Application No. PCT/CN2023/096647, filed on May 26, 2023, which claims priority to Chinese patent application No. 202211446727.3, filed on Nov. 18, 2022. The aforementioned patent applications are incorporated herein by reference in their entirety.

TECHNICAL FIELD

This application relates to the field of battery testing devices, and specifically to a surface density device calibration apparatus and a surface density device calibration method.

BACKGROUND

An electrode plate is an important component of a battery, and a coating effect of the electrode plate directly affects the performance of the battery, so the coating effect of the electrode plate needs to be tested.

The coating effect of electrode plates is usually tested using a surface density device. The surface density device needs to be calibrated before use and a conventional calibration process involves using a standard electrode plate. However, it takes a long time for producing standard electrode plates, leading to low calibration efficiency. Therefore, improving the calibration efficiency of the surface density device is an urgent technical issue that needs to be solved.

SUMMARY

This application is intended to provide a surface density device calibration apparatus and a surface density device calibration method. The surface density device calibration apparatus can improve calibration efficiency of a surface density device.

According to one aspect, an embodiment of this application provides a surface density device calibration apparatus for calibrating a surface density measurement device. The surface density device calibration apparatus includes a mounting bracket, a standard member, and an adjusting member. The mounting bracket is configured for mounting a surface density device. The standard member includes multiple standard zones with different densities. The adjusting member connects the standard member and the mounting bracket, and the adjusting member is configured to adjust positions of the multiple standard zones such that the multiple standard zones move one by one to a testing position of the surface density device.

In the foregoing solution, the standard member is adjusted by the adjusting member such that the standard zones at a measurement position of the surface density device can be changed, so as to measure surface density measurement values of the multiple standard zones, and then a linear regression is performed on the surface density measurement values of the standard zones and corresponding surface density values of the standard zones to complete a calibration process of the surface density device. The standard member is used instead of an electrode plate for calibrating the surface density device, so that the production process of the electrode plate is omitted, thus reducing the time required for calibration and improving the calibration efficiency.

In some embodiments, the standard member is rotatably disposed on the mounting bracket, the multiple standard zones are provided around a rotation center of the standard member, and the adjusting member is configured to drive the standard member to rotate relative to the mounting bracket so as to adjust the positions of the multiple standard zones.

In the foregoing solution, the standard member is driven by the adjusting member to rotate relative to the mounting bracket, so as to switch the standard zone at the testing position of the surface density device, satisfying calibration requirements of the surface density device. During switching, the standard member rotates only relative to the mounting bracket, and a connection position of the standard member and the mounting bracket is not changed, facilitating control of the position of the standard zone, thereby reducing the risk that the rays from the surface density device are unable to irradiate the standard zone due to deviation in the position of the standard zone.

In some embodiments, in the embodiment where the standard member is rotatably disposed on the mounting bracket, the multiple standard zones are integrally formed.

In the foregoing solution, the multiple standard zones are integrally formed. In this way, the structural strength of the standard member is improved, and the service life of the standard member is prolonged. In addition, relative positions between the standard zones are fixed, reducing the risk that the surface density device is unable to accurately measure surface density of the standard zone due to deviation of the standard zone during calibration of the surface density device.

In some embodiments, the mounting bracket further includes a mounting disc, where the multiple standard zones are provided around an outer side of the mounting disc, and the mounting disc is connected to the adjusting member.

In the foregoing solution, the standard zone is connected to the adjusting member through the mounting disc, which facilitates mounting and fixing of the standard zone. In addition, when the standard zone is driven to rotate, the torque generated by the adjusting member acts on the mounting disc instead of directly on the standard zone, reducing the risk of deformation of the standard zone caused by a force upon it.

In some embodiments, the standard zone and the mounting disc are integrally formed.

In the foregoing solution, the standard zone and the mounting disc are integrally formed. In this way, the connection strength between the standard zone and the mounting disc is enhanced, reducing the risk of movement of the standard zone relative to the mounting disc.

In some embodiments, the multiple standard zones are continuously provided along a circumferential direction of the mounting disc.

In the foregoing solution, the standard zones are continuously provided along the circumferential direction of the mounting disc. In this way, area of the standard zone available for rays to pass through is increased, which reduces the risk that the rays from the surface density device are unable to irradiate the standard zone due to excessively small area of the standard zone. In addition, when the mounting disc rotates, the standard zones can pass through the measurement position of the surface density device in sequence, with no need to manually replace a standard piece, thus improving the calibration efficiency.

In some embodiments, one of the multiple standard zones is provided with a hollow portion.

In the foregoing solution, with provision of the hollow portion in the standard zone, the calibration process of the surface density device can be completed without disassembling the standard member, thus improving the calibration efficiency.

In some embodiments, the standard member further includes a mounting disc, the mounting disc being connected to the mounting bracket, and the mounting disc being provided with multiple through holes spaced apart along a circumferential direction of the mounting disc; the standard zones are mounted on the mounting disc, one standard zone covering one through hole; and the mounting disc is connected to the adjusting member.

In the foregoing solution, the mounting disc can support and fix the standard zone, allowing the standard zone in the embodiments of this application to be made of a hard material or a soft material, thereby broadening an application range of the standard zone.

In some embodiments, the mounting disc is provided with a locking mechanism, the locking mechanism being configured to lock the standard zone to the mounting disc.

In the foregoing solution, the standard zone is locked to the mounting disc by the locking mechanism, reducing the risk of movement of the standard zone relative to the mounting disc, and improving the reliability of the standard member.

In some embodiments, the locking mechanism includes a pressure ring and a connecting member, the pressure ring, the standard zone, and the mounting disc are stacked, the standard zone is located between the pressure ring and the mounting disc, and the connecting member connects the pressure ring and the mounting disc.

In the foregoing solution, the connecting member allows the pressure ring to be tightly pressed against the standard zone such that the standard zone can be fixed to the mounting disc, reducing the risk of loosening of the standard zone and improving the reliability of the standard member. In addition, if the standard zone is made of a soft material, the pressure ring can keep the standard zone taut, reducing the risk of measurement errors caused by wrinkling of the standard zone.

In some embodiments, the mounting disc is provided with a hollow portion, the hollow portion being staggered from the standard zone along the circumferential direction of the mounting disc.

In the foregoing solution, the hollow portion is staggered from the standard zone, so that the mounting disc can switch between a calibration state in which the hollow portion is at the measurement position and a measurement state in which the standard zone is at the measurement position. The switching process can be implemented simply by rotating the mounting disc without disassembling the mounting disc, thus improving the calibration efficiency.

In some embodiments, the standard zone includes a coating layer and an electrode plate, where a closed cavity is provided inside the coating layer, and the electrode plate is located in the closed cavity.

In the foregoing solution, the closed cavity can protect the electrode plate to reduce the risk of scratch and damage to the electrode plate caused by external objects. The closed cavity can also reduce the risk of volatilization of components of the electrode plate, making the electrode plate reusable.

In some embodiments, thicknesses of the multiple standard zones gradually increase in a circumferential direction of the standard member.

In the foregoing solution, the multiple standard zones are arranged with the thicknesses gradually increasing along the circumferential direction of the standard member. The standard member only needs to rotate along one direction to ensure that the surface density device can measure all standard zones in sequence, improving the calibration efficiency and reducing the risk of missed measurements.

In some embodiments, the standard member is movably disposed on the mounting bracket in a first direction, the multiple standard zones are arranged along the first direction, and the adjusting member is configured to drive the standard member to move along the first direction, so as to adjust positions of the multiple standard zones relative to the mounting bracket.

In the foregoing solution, the standard member is capable of moving relative to the mounting bracket along the first direction, which facilitates adjustment of a position of the standard member relative to the measurement position of the surface density device so as to obtain a better measurement effect. Such design also allows the standard member to move away from the measurement position of the surface density device, so that the purpose of calibrating the surface density device can be achieved without providing the hollow portion in the standard zone, simplifying processing procedures.

In some embodiments, in the embodiment where the standard member is movably disposed on the mounting bracket in the first direction, the multiple standard zones are integrally formed.

In the foregoing solution, the multiple standard zones are integrally formed, which improves the structural strength of the standard member, reducing the risk of bending or breakage of the standard member during moving along the first direction.

In some embodiments, the multiple standard zones are continuously provided along the first direction.

In the foregoing solution, on one hand, the multiple standard zones being continuously provided along the first direction makes the structure of the standard member more compact and reduces the length of the standard member in the first direction, thereby reducing the risk of bending of the standard member. On the other hand, the multiple standard zones being continuously provided along the first direction shortens the movement distance of the standard member in the calibration process, thereby reducing the time required for calibration and improving the calibration efficiency.

In some embodiments, thicknesses of the multiple standard zones gradually increase in the first direction.

In the foregoing solution, the multiple standard zones are arranged with the thicknesses gradually increasing. In this way, the standard member only needs to move along the first direction to ensure that the surface density device can measure all standard zones in sequence, improving the calibration efficiency.

In some embodiments, the standard zone is made of steel.

In the foregoing solution, the steel material makes the standard zone reusable, prolonging the service life of the standard zone.

According to another aspect, an embodiment of this application further provides a surface density device calibration method including: mounting a surface density device mounting bracket; measuring surface density values of the multiple standard zones using the surface density device calibration apparatus; obtaining relative surface density values of electrode plates corresponding to the multiple standard zones at a current ambient temperature; and performing a linear regression analysis according to the surface density values of the multiple standard zones and the relative surface density values of the multiple standard zones to calibrate the surface density device through the standard member.

The standard member is used instead of the conventional electrode plate for calibration and the corresponding relative surface density values of the standard zones are known in advance, so that a weighing process in the conventional calibration process is omitted, improving the calibration efficiency. In addition, one standard member can be used for formulation calibration of multiple types of electrode plates, reducing the calibration cost.

In some embodiments, before the obtaining relative surface density values of electrode plates corresponding to the multiple standard zones at a current ambient temperature, the calibration method further includes: calibrating the surface density device through the electrode plate at a given ambient temperature; measuring surface density values of the multiple standard zones through the calibrated surface density device to obtain the relative surface density values of the electrode plates corresponding to the multiple standard zones at the current ambient temperature; and changing the ambient temperature and repeating the foregoing steps.

In the foregoing solution, the electrode plate is used to calibrate the surface density device, a surface density value obtained by measuring the standard zone through the calibrated surface density device is a relative surface density value reflecting a surface density of the electrode plate, so that the standard zone can replace the electrode plate for calibration.

In some embodiments, the calibrating the surface density device through the electrode plate includes: manufacturing multiple electrode plates with different surface densities; measuring surface density values of the electrode plates through the surface density device; obtaining actual surface density values of the electrode plates; and performing a linear regression analysis according to the actual surface density values of the multiple electrode plates and the surface density values of the multiple electrode plates to calibrate the surface density device through the electrode plates.

In some embodiments, the obtaining actual surface density values of the multiple electrode plates includes: sampling the multiple electrode plates separately; weighing samples through a weighing device; and calculating actual surface density values of the electrode plates corresponding to the samples based on weights and areas of the samples.

In some embodiments, multiple samples are taken from each electrode plate, and the actual surface density value of each electrode plate is an average of surface density values of the corresponding multiple samples.

In the foregoing solution, multiple samples are taken from the electrode plate and the average of the surface density values of the multiple samples is calculated, reducing the risk of errors in the actual surface density values and improving accuracy in subsequent calibration of the surface density device.

In some embodiments, 6-12 samples are taken from each electrode plate.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the optional embodiments below. The accompanying drawings are merely intended to illustrate the optional embodiments and are not intended to limit this application. In addition, in all the accompanying drawings, like reference signs denote like components. In the accompanying drawings.

Figure 1:
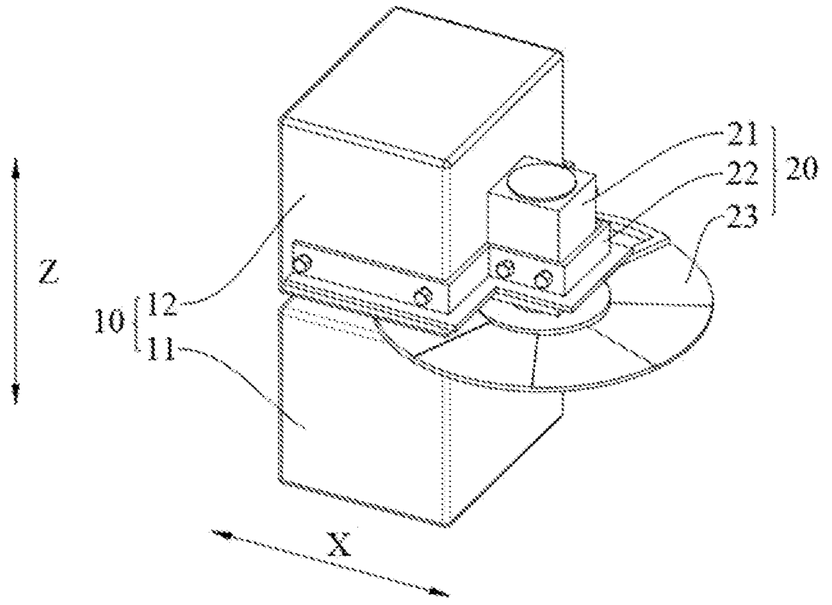
FIG. 1 is a schematic structural diagram of a surface density device calibration apparatus according to some embodiments of this application.

Reference signs in the specific embodiments are described as follows:

10. surface density device;

11. detection member;

12. emitting member;

20. calibration apparatus;

21. adjusting member;

211. support disc;
212. measurement hole;
22. mounting bracket;
221. clamping portion;
222. clamping bolt;
223. fixing portion;
224. fixing bolt;
23. standard member;
231. standard zone;
231*a*. coating layer;
231*b*. electrode plate;
232. hollow portion;
233. mounting disc;
234. through hole;
235. locking mechanism;
235*a*. pressure ring; and
235*b*. connecting member.

DETAILED DESCRIPTION

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, particular sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for case and brevity of description of the embodiments of this application rather than indicating or implying that the means or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection through an intermediate medium, an internal communication between two elements, or an interaction between two elements. Persons of ordinary skill in the art can understand specific meanings of these terms in the embodiments of this application as appropriate to specific situations.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

A surface density device is a device configured to test surface density (weight per unit area) of an object in a non-contact testing manner. The surface density device typically includes an emitting member and a detection member, where the emitting member can emit rays, and the detection member is configured to detect intensity of rays. The rays emitted by the emitting member pass through an object under test to irradiate the detection member. After the rays pass through the object under test, the intensity of the rays is attenuated, with an attenuation proportion in a negative exponential relationship with density of the object under test. Therefore, the detection member can deduce surface density of the object under test by measuring intensity of the received rays and comparing it with the intensity measured before the rays pass through the object under test.

An electrode plate, as an important component of a battery, typically includes a current collector layer and an active material layer. The active material layer is applied on the current collector layer, and thickness of an active material has a great influence on properties such as capacity and service life of the battery. An excessively small thickness of the active material leads to an excessively low capacity of the battery. An excessively large thickness of the active material leads to an excessively high capacity of the battery, and the battery is prone to lithium precipitation, shortening the service life of the battery. Therefore, during electrode plate production, the thickness of the active material needs to be measured so as to ensure consistent surface density of the electrode plate. With the characteristic of non-contact measurement, the surface density device can reduce the risk that the conventional contact-type measurement device is likely to scratch electrode plates. Furthermore, with high measurement efficiency, the surface density device is suitable for surface density measurement of electrode plates.

The surface density device needs to be calibrated before use. The purpose of calibration is to find out a correlation between measurement values of a measurement device and surface density of an electrode plate. In the conventional calibration method, a sample electrode plate needs to be manufactured in advance and is then measured using the surface density device. Then, the sample electrode plate is sampled, and a sampled sample is weighed using an electronic scale to calculate an actual surface density value of the electrode plate. Then, a linear regression is performed on data obtained by measuring the sample electrode plate through the surface density device and the actual surface density value of the electrode plate, to implement the calibration process of the surface density device.

In related technologies, due to the difficulty in storage of electrode plates, if electrode plates are used for calibration, an electrode plate needs to be manufactured every time a new surface density device requires calibration. However, a coating process of electrode plates includes multiple procedures such as coating and drying, which leads to a long production time of the electrode plate and thus leads to low calibration efficiency.

In view of the foregoing problems in the prior art, an embodiment of this application designs a surface density device calibration apparatus including a mounting bracket, a standard member, and an adjusting member. The mounting bracket is configured for mounting a surface density device. The standard member includes multiple standard zones with different densities. The adjusting member connects the standard member and the mounting bracket, and the adjusting member is configured to adjust positions of the multiple standard zones such that the multiple standard zones move one by one to a testing position of the surface density device.

The standard member can move through the adjusting member such that rays from the surface density device can pass through different standard zones. A linear regression is performed on a value measured by the surface density device and a surface density value of the standard member for calibration. The standard member is used instead of an electrode plate for calibrating the surface density device, which reduces the production time of the electrode plate and improves the calibration efficiency of the surface density device.

In addition, the inventors have also designed a surface density device calibration method. The method includes: mounting the surface density device calibration apparatus in the foregoing embodiment to a surface density device, and calibrating the surface density device through the standard member in the calibration apparatus.

The calibration method can implement the calibration process of the surface density device without using the electrode plate, improving the calibration efficiency.

Figure 2:
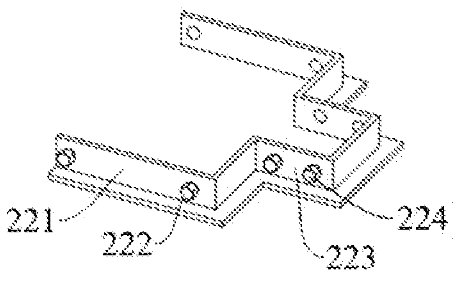
FIG. 2 is a schematic structural diagram of a mounting bracket according to some embodiments of this application.

According to some embodiments of this application, referring to FIG. 1 and FIG. 2. FIG. 1 is a schematic structural diagram of a surface density device 10 calibration apparatus 20 according to some embodiments of this application, and FIG. 2 is a schematic structural diagram of a mounting bracket 22 according to some embodiments of this application. An embodiment of this application provides a surface density device 10 calibration apparatus 20 for calibrating a surface density measurement device. The surface density device 10 calibration apparatus 20 includes a mounting bracket 22, a standard member 23, and an adjusting member 21. The mounting bracket 22 is configured for mounting a surface density device 10. The standard member 23 includes multiple standard zones 231 with different densities. The adjusting member 21 connects the standard member 23 and the mounting bracket 22, and the adjusting member 21 is configured to adjust positions of the multiple standard zones 231 such that the multiple standard zones 231 move one by one to a testing position of the surface density device 10.

The surface density device 10 may typically include an emitting member 12 and a detection member 11. The emitting member 12 and the detection member 11 may be disposed opposite each other. The emitting member 12 is capable of emitting rays to the detection member 11. The detection member 11 is configured to detect intensity of rays. When the standard zone 231 is provided between the emitting member 12 and an elastic member, the rays emitted by the emitting member 12 pass through the standard zone 231. Surface density of the standard zone 231 is measured based on the intensity of the rays detected by the detection member 11.

The mounting bracket 22 is configured to connect the standard member 23 to the surface density device 10 such that the rays from the surface density device 10 can pass through the standard zone 231.

The mounting bracket 22 may be connected to the emitting member 12 or the detection member 11.

The mounting bracket 22 may be detachably connected to the surface density device 10 such that the calibration apparatus 20 can be taken down after the surface density device 10 has been calibrated.

The mounting bracket 22 may include a clamping portion 221 for fixing the mounting bracket 22 to the surface density device 10.

The clamping portion 221 may include two clamping units spaced apart, where a clamping space is formed between the two clamping units. When the calibration apparatus 20 is connected to the surface density device 10, the surface density device 10 is clamped between the two clamping units, so as to connect the mounting bracket 22 to the surface density device 10.

The clamping unit may be provided with a clamping member for locking the mounting bracket 22 to the surface density device 10. For example, the clamping member may be a clamping bolt 222, the clamping bolt 222 being threadedly connected to the clamping unit. When the surface density device 10 is clamped between the two clamping units, the clamping bolt 222 can be screwed such that the clamping bolt 222 can abut against an outer wall surface of the surface density device 10, thereby allowing the mounting bracket 22 to be stably connected to the surface density device 10. Either or both of the two clamping units may be provided with the clamping bolt 222.

The clamping member may alternatively be a spacer. After the clamping unit is mounted to a designated position, the spacer is clamped between the clamping unit and the surface density device 10, so that the mounting bracket 22 can be stably connected to the surface density device 10.

The mounting bracket 22 may further include a fixing portion 223 for fixing the adjusting member 21 to the mounting bracket 22.

The fixing portion 223 may include two fixing units spaced apart, where a fixing space is formed between the two fixing units, and the adjusting member 21 is disposed between the two fixing units such that the adjusting member 21 is connected to the mounting bracket 22.

The fixing unit may be provided with a fixing member for locking the adjusting member 21 to the mounting bracket 22. For example, the fixing member may be a fixing bolt 224, the fixing bolt 224 being threadedly connected to the fixing unit. When the adjusting member 21 is clamped between the two fixing units, the fixing bolt 224 can be screwed such that the fixing bolt 224 can abut against an outer wall surface of the adjusting member 21. thereby allowing the adjusting member 21 to be stably connected to the mounting bracket 22. One of the two fixing units may be provided with the fixing bolt 224, or the two fixing units are both provided with the fixing bolt.

The fixing member may alternatively be a spacer. When the adjusting member 21 is clamped between the two fixing units, the spacer is clamped between the adjusting member 21 and the fixing unit, allowing the adjusting member 21 to be stably connected to the mounting bracket 22.

The clamping unit and the fixing unit may be connected through a first connecting portion, and the two fixing units may be connected through a second connecting portion, so that the clamping unit and the fixing unit form an entirety, improving the fixing effect of the adjusting member 21. Further, the clamping unit, the fixing unit, the first connecting portion, and the second connecting portion may be integrally formed.

In this embodiment of this application, the standard member 23 refers to a component that has standard zones 231 with corresponding surface density values known and can be reused in calibrating the surface density device 10.

The standard member 23 may include multiple standard zones 231 made of a same material, for example, the standard zones 231 are all made of stainless steel.

The standard member 23 may further include multiple standard zones 231 made of different materials. For example, the standard zones 231 may be made of stainless steel or an electrode plate 231*b*. The standard member 23 may include both standard zones 231 made of stainless steel and standard zones 231 made of the electrode plate 231*b*.

The multiple standard zones 231 may be integrally formed. For example, the standard member 23 may be an entirety, the standard member 23 has multiple zones with different thicknesses, and these zones with different thicknesses form standard zones 231 (different thicknesses lead to different surface densities).

The multiple standard zones 231 may alternatively be separate components. The standard zones 231 may be directly connected or the standard zones 231 may be indirectly connected through other fixing portions 223. For example, the standard member 23 may further include a support member, and the standard zones 231 are provided on the support member.

Shapes of the multiple standard zones 231 may be the same or not entirely identical. For example, the standard zones 231 may all be circular, or some of the standard zones 231 may be circular and some of the standard zones 231 may be rectangular.

Among the multiple standard zones 231, all of the standard zones 231 may be different in thickness, or some of the standard zones 231 may be identical in thickness.

The standard zones 231 may be in non-clearance fit with each other or may be in clearance fit with each other.

The standard member 23 may be circular or elliptical, or may be triangular, rectangular, pentagonal, hexagonal, or of other polygonal structures.

The standard zone 231 may also be circular or elliptical, or may be triangular, rectangular, pentagonal, hexagonal, or of other polygonal structures.

The adjusting member 21 may be selected based on a movement manner of the standard member 23 relative to the mounting bracket 22. For example, if the standard member 23 rotates relative to the mounting bracket 22, the adjusting member 21 may include a motor, where a housing of the motor may be fixed to the fixing portion 223, and an output end of the motor is in transmission connection with the standard member 23 so as to drive the standard member 23 to rotate relative to the mounting bracket 22.

In this embodiment, the adjusting member 21 may further include a transmission structure. For example, the adjusting member 21 may further include a speed reducer, where the output end of the motor is in transmission connection with an output end of the speed reducer, and the output end of the speed reducer is in transmission connection with the standard member 23.

If the standard member 23 moves linearly relative to the mounting bracket 22, the adjusting member 21 may include a cylinder, where a housing of the cylinder may be fixed to the fixing portion 223, and a telescopic end of the cylinder is connected to the standard member 23 so as to drive the standard member 23 to move relative to the mounting bracket 22.

In this embodiment, the mounting bracket 22 may be provided with a guide rail. The standard member 23 may be slidably connected to the guide rail to increase movement accuracy of the standard member 23.

The standard member 23 is adjusted by the adjusting member 21 such that the standard zone 231 at a measurement position of the surface density device 10 can be changed, so as to measure surface density measurement values of the multiple standard zones 231. Corresponding surface density values of the standard zones 231 of the standard member 23 can be measured in advance. A linear regression is performed on the surface density measurement values of the standard zones 231 and the corresponding surface density values of the standard zones 231 to complete a calibration process of the surface density device 10.

The standard member 23 is used instead of the electrode plate 231*b* for calibrating the surface density device 10, so that the production process of the electrode plate 231*b* is omitted, thus reducing the time required for calibration and improving the calibration efficiency.

The corresponding surface density values of the standard zones 231 of the standard member 23 are known and the standard member 23 can be reused. Therefore, the standard member 23 can be used for calibrating multiple surface density devices 10, further improving the calibration efficiency and improving the calibration accuracy.

According to some embodiments of this application, referring to FIG. 1, the standard member 23 is rotatably disposed on the mounting bracket 22, the multiple standard zones 231 are provided around a rotation center of the standard member 23, and the adjusting member 21 is configured to drive the standard member 23 to rotate relative to the mounting bracket 22 so as to adjust the positions of the multiple standard zones 231.

The standard member 23 may be rotatably connected to the mounting bracket 22 through a rotating shaft. In the embodiment where the mounting bracket 22 includes the fixing portion 223 or the clamping portion 221, the standard member 23 may be rotatably connected to the fixing portion 223 or the clamping portion 221 through the rotating shaft, and the adjusting member 21 is in transmission connection with the rotating shaft to drive the standard member 23 to rotate.

The standard member 23 may further be directly rotatably connected to the adjusting member 21. For example, in the embodiment where the adjusting member 21 includes the motor, the output end of the motor may be in transmission connection with the standard member 23, and the output end of the motor can not only support the standard member 23 but also drive the standard member 23 to rotate.

In this embodiment, the standard zone 231 may be a fan-shaped structure. In this way, multiple standard zones 231 can be arranged in sequence around the rotation center of the standard member 23. In addition, with the fan-shaped structure, the multiple standard zones 231 can be arranged tightly, which increases area of a single standard zone 231, and reduces the risk that rays from the surface density device 10 are unable to irradiate the standard zone 231 due to deviation in the position of the standard zone 231.

In the embodiment where the surface density device 10 includes the emitting member 12 and the detection member 11, during specific mounting of the standard member 23, the standard member 23 may be at least partially disposed between the emitting member 12 and the detection member 11. In this way, in the rotation process of the standard member 23, the probability that one standard zone 231 can be irradiated by the rays from the surface density device 10 is increased.

Under the driving action of the adjusting member 21, the standard member 23 can rotate relative to the mounting bracket 22 to switch the standard zone 231 at the testing position of the surface density device 10, satisfying calibration requirements of the surface density device 10. During switching, the standard member 23 rotates only relative to the mounting bracket 22, and a connection position of the standard member 23 and the mounting bracket 22 is not changed, facilitating control of the position of the standard zone 231, thereby reducing the risk that the rays from the surface density device 10 are unable to irradiate the standard zone 231 due to deviation in the position of the standard zone 231.

Figure 3:
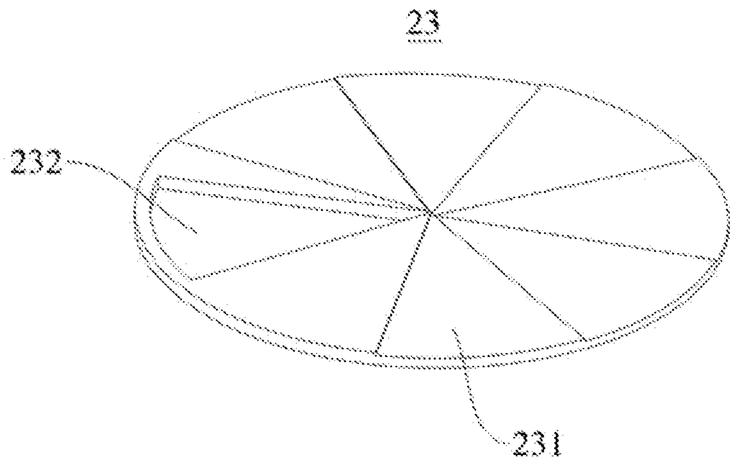
FIG. 3 is a schematic structural diagram of a standard member (the standard member is provided with no mounting disc) according to some embodiments of this application.

According to some embodiments of this application, referring to FIG. 3, FIG. 3 is a schematic structural diagram of a standard member 23 (the standard member 23 is provided with no mounting disc 233) according to some embodiments of this application. In the embodiment where the standard member 23 is rotatably disposed on the mounting bracket 22, the multiple standard zones 231 are integrally formed.

The multiple standard zones 231 may be integrally formed into a ring structure, and a connecting member 235*b* may be disposed in the middle of ring structure such that the multiple standard zones 231 can be connected to the adjusting member 21.

The multiple standard zones 231 may alternatively be integrally formed into a disc structure, and the center of the disc structure is connected to the adjusting member 21.

The multiple standard zones 231 are integrally formed. In this way, the structural strength of the standard member 23 is improved, and the service life of the standard member 23 is prolonged. In addition, relative positions between the standard zones 231 are fixed, reducing the risk that the surface density device 10 is unable to accurately measure surface density of the standard zone 231 due to deviation of the standard zone 231 in the process of calibrating the surface density device 10.

Figure 4:
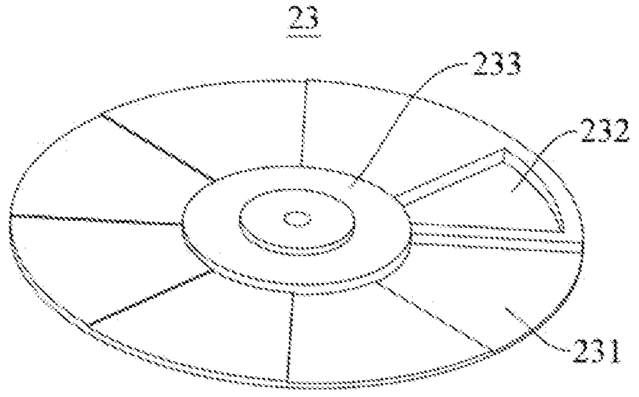
FIG. 4 is a schematic structural diagram of a standard member (the standard member is provided with a mounting disc) according to some embodiments of this application.

According to some embodiments of this application, referring to FIG. 4, FIG. 4 is a schematic structural diagram of a standard member 23 (the standard member 23 is provided with a mounting disc 233) according to some embodiments of this application. The multiple standard zones 231 are provided around an outer side of the mounting disc 233, and the mounting disc 233 is connected to the adjusting member 21.

The multiple standard zones 231 are integrally formed into a ring structure, and in the embodiment where the connecting member 235*b* is disposed in the middle of the ring structure, the mounting disc 233 may be the connecting member 235*b* in the foregoing embodiment.

Figure 5:
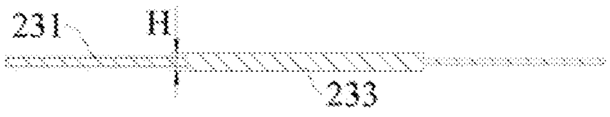
FIG. 5 is a schematic diagram showing connection between a standard zone and a mounting disc according to some embodiments of this application.

Referring to FIG. 5, FIG. 5 is a schematic diagram showing connection between a standard zone 231 and a mounting disc 233 according to some embodiments of this application.

Figure 6:
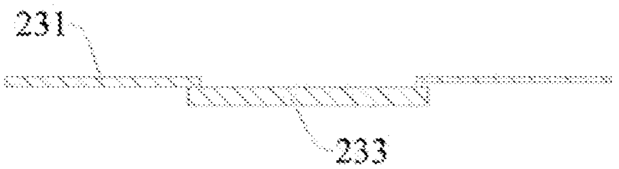
FIG. 6 is a schematic diagram showing connection between a standard zone and a mounting disc according to some other embodiments of this application.

An outer side of the mounting disc 233 may be an edge of the mounting disc 233. For example, when the mounting disc 233 is a disc structure, the outer side of the mounting disc 233 may be an outer peripheral surface of the mounting disc 233. The outer side of the mounting disc 233 may alternatively be a portion of the mounting disc 233 close to the edge. For example, referring to FIG. 6, FIG. 6 is a schematic diagram showing connection between a standard zone 231 and a mounting disc 233 according to some other embodiments of this application. When the mounting disc 233 is a disc structure, the outer side of the mounting disc 233 may be a portion of the mounting disc 233 close to the outer peripheral surface.

The standard zone 231 is connected to the adjusting member 21 through the mounting disc 233, which facilitates mounting and fixing of the standard zone 231. In addition, when the standard zone 231 is driven to rotate, the torque generated by the adjusting member 21 acts on the mounting disc 233 instead of directly on the standard zone 231, reducing the risk of deformation of the standard zone 231 due to the force upon it.

According to some embodiments of this application, the standard zone 231 and the mounting disc 233 are integrally formed.

Referring to FIG. 5, when the standard zone 231 and the mounting disc 233 are integrally formed, thickness H of the mounting disc 233 can be made greater than thickness of the standard zone 231, so as to enhance the strength of the mounting disc 233.

The standard zone 231 and the mounting disc 233 are integrally formed, which enhances the connection strength between the standard zone 231 and the mounting disc 233, and reduces the risk of movement of the standard zone 231 relative to the mounting disc 233.

According to some embodiments of this application, referring to FIG. 4, multiple standard zones 231 are continuously provided along a circumferential direction of the mounting disc 233.

The standard zones 231 being continuously provided along the circumferential direction of the mounting disc 233 means that the standard zones 231 are arranged in sequence around the circumferential direction of the mounting disc 233 with no gap or a minimal gap between adjacent standard zones 231.

In this embodiment, the standard zones 231 may be provided circumferentially along the circumferential direction of the mounting disc 233.

When the multiple standard zones 231 are arranged along the circumferential direction of the mounting disc 233, junctions of adjacent standard zones 231 may be integrally formed so that there is no gap between the standard zones 231. Alternatively, the adjacent standard zones 231 may abut against each other tightly so that only a minimal gap is present between the standard zones 231. The minimal gap refers to a gap smaller than 2 mm between the standard zones 231.

In this embodiment, the mounting disc 233 may be a disc structure, facilitating arrangement of multiple standard zones 231 around the center of the mounting disc 233.

The standard zones 231 are continuously provided along the circumferential direction of the mounting disc 233. In this way, area of the standard zone 231 available for rays to pass through is increased, which reduces the risk that the rays from the surface density device 10 are unable to irradiate the standard zone 231 due to excessively small area of the standard zone 231. In addition, as the area of the standard zone 231 available for the rays to pass through increases, it is conducive to repeatedly measuring a same standard zone 231. reducing measurement errors. In addition, when the mounting disc 233 rotates, the standard zones 231 can pass through the measurement position of the surface density device 10 in sequence, so as to calibrate the surface density device 10 with no need to manually replacing a standard piece, thus improving the calibration efficiency.

According to some embodiments of this application, referring to FIG. 3 and FIG. 4, one of the multiple standard zones 231 is provided with a hollow portion 232.

To reduce the influence of ambient temperature and humidity on measurement accuracy, the surface density device 10 needs to directly measure intensity of the rays after the rays pass through air so as to calibrate subsequent measurements on the standard zone 231.

The hollow portion 232 is used for the rays from the surface density device 10 to pass through, facilitating calibration of the surface density device 10.

The hollow portion 232 may be a calibration hole formed in the standard zone 231. In the embodiment where the standard zone 231 is fan-shaped, the calibration hole may be a fan-shaped hole concentric with the standard zone 231.

The hollow portion 232 may alternatively be a notched groove extending to the edge of the standard zone 231.

With provision of the hollow portion 232 in the standard zone 231, the calibration process of the surface density device 10 can be completed without disassembling the standard member 23, thus improving the calibration efficiency.

Figure 7:
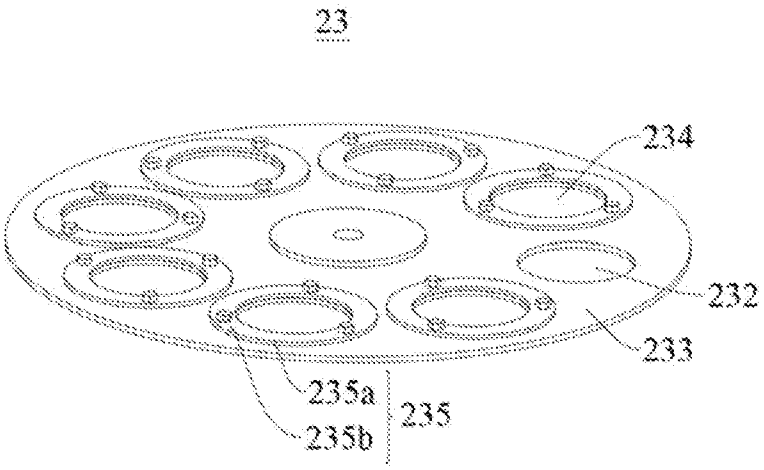
FIG. 7 is a schematic structural diagram of a standard member (a mounting disc is provided with through holes, and the through holes are in one-to-one correspondence with standard zones) according to some embodiments of this application.

According to some embodiments of this application, referring to FIG. 7, FIG. 7 is a schematic structural diagram of a standard member 23 (a mounting disc 233 is provided with through holes 234, and the through holes 234 are in one-to-one correspondence with standard zones 231) according to some embodiments of this application. The standard member 23 may further include a mounting disc 233, the mounting disc 233 being connected to the mounting bracket 22, and the mounting disc 233 being provided with multiple through holes 234 spaced apart along a circumferential direction of the mounting disc 233. The standard zones 231 are mounted on the mounting disc 233, one standard zone 231 covering one through hole 234. The mounting disc 233 is connected to the adjusting member 21.

In this embodiment, the mounting disc 233 can fix and support the standard zone 231, allowing the standard zone 231 to be made of a hard material or a soft material.

The through hole 234 may be circular, or may be triangular, rectangular, pentagonal, or of other polygonal shapes.

In this embodiment, the through holes 234 may be provided along the circumferential direction of the mounting disc 233, so that the multiple standard zones 231 can be distributed along the circumference of the mounting disc 233, thereby allowing for switching of the standard zones 231 on the surface density device 10 when the mounting disc 233 rotates.

In this embodiment, the mounting disc 233 may be a disc structure, and the through hole 234 may be provided circumferentially around the center of the mounting disc 233.

The standard zone 231 and the mounting disc 233 may be detachably connected. For example, the standard zone 231 may be bonded to the mounting disc 233, or the standard zone 231 may be tightly pressed against the mounting disc 233 through other components.

The standard zone 231 may fully cover the through hole 234 or partially cover the through hole 234.

The through hole 234 is formed in the mounting disc 233 for the rays to pass through. In this way, when the standard zone 231 covers the through hole 234, the surface density device 10 can measure surface density of the standard zone 231. On one hand, the mounting disc 233 can support and fix the standard zone 231, allowing the standard zone 231 in the embodiments of this application to be made of a hard material or a soft material, thereby broadening the application range of the standard zone 231. On the other hand, the mounting disc 233 can protect the standard zone 231, reducing the risk of collision between the standard zone 231 and the outside.

Figure 8:
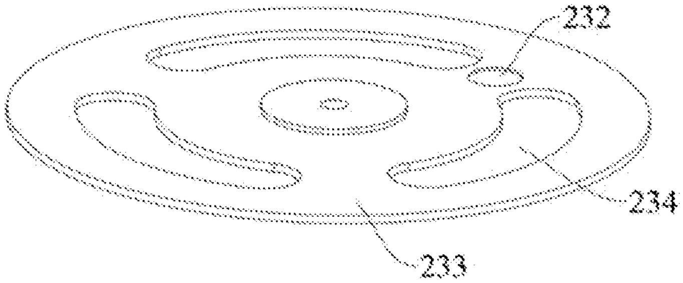
FIG. 8 is a schematic structural diagram of a standard member (a mounting disc is provided with through holes, and one through hole corresponds to multiple standard zones) according to some embodiments of this application.

According to some other embodiments of this application, referring to FIG. 8, FIG. 8 is a schematic structural diagram of a standard member 23 (a mounting disc 233 is provided with through holes 234, and one through hole 234 corresponds to multiple standard zones 231) according to some embodiments of this application. The through hole 234 may be of a circular arc shape. Multiple standard zones 231 all cover a same through hole 234.

One through hole 234 corresponding to multiple standard zones 231 facilitates flexible arrangement of positions of the standard zones 231, improving adaptability of the standard member 23.

According to some embodiments of this application, referring to FIG. 7, the mounting disc 233 is provided with a locking mechanism 235, the locking mechanism 235 being configured to lock the standard zone 231 to the mounting disc 233.

The locking mechanism 235 may lock the standard zone 231 by applying pressure to the standard zone 231. For example, the locking mechanism 235 may include a pressing member, and the standard zone 231 is tightly pressed against the mounting disc 233 by the pressing member.

The locking mechanism 235 may alternatively lock the standard zone 231 by limiting the standard zone 231. For example, the locking mechanism 235 may include an insertion slot provided in the mounting disc 233, and the standard zone 231 is inserted into the insertion slot to lock the standard zone 231.

The standard zone 231 is locked to the mounting disc 233 by the locking mechanism 235. In this way, the risk of movement of the standard zone 231 relative to the mounting disc 233 is reduced, and the reliability of the standard member 23 is improved.

According to some embodiments of this application, referring to FIG. 7, the locking mechanism 235 includes a pressure ring **235*a* and a connecting member 235*b*, the pressure ring 235*a*, the standard zone 231, and the mounting disc 233 are stacked, the standard zone 231 is located between the pressure ring 235***a* and the mounting disc 233, and the connecting member 235*b* connects the pressure ring 235*a* and the mounting disc 233.

The pressure ring 235*a* is configured to tightly press the standard zone 231 against the mounting disc 233.

The pressure ring 235*a* may be a ring structure. When the pressure ring 235*a* is connected to the mounting disc 233, the pressure ring 235*a* may be disposed around an edge of the through hole 234, avoiding the pressure ring 235*a* from shielding the standard zone 231 and causing inaccurate measurement of the surface density device 10.

The connecting member 235*b* is configured to connect the pressure ring 235*a* and the mounting disc 233 such that the pressure ring 235*a* can apply pressure to the standard zone 231. The connecting member 235*b* may have a bolt and a nut. The mounting disc 233 and the pressure ring 235*a* may be each provided with a connection hole. A rod portion of the bolt runs through the connection holes of the mounting disc 233 and the pressure ring 235*a* to be connected with the nut, so as to connect the pressure ring 235*a* and the mounting disc 233. Alternatively, the connecting member 235*b* may have only the bolt without the nut. The mounting disc 233 may be provided with a threaded hole, and the pressure ring 235*a* may be provided with a connection hole. The bolt runs through the connection hole of the pressure ring 235*a* to be threadedly connected to the threaded hole.

The connecting member 235*b* allows the pressure ring 235*a* to be tightly pressed against the standard zone 231 such that the standard zone 231 can be fixed to the mounting disc 233, reducing the risk of loosening of the standard zone 231 and improving the reliability of the standard member 23. In addition, if the standard zone 231 is made of a soft material, the pressure ring 235*a* can keep the standard zone 231 taut, reducing the risk of measurement errors due to wrinkling of the standard zone 231.

According to some embodiments of this application, referring to FIG. 7, the mounting disc 233 is provided with a hollow portion 232, the hollow portion 232 being staggered from the standard zone 231 along the circumferential direction of the mounting disc 233.

The hollow portion 232 is used for the rays from the surface density device 10 to pass through, facilitating calibration of the surface density device 10.

The hollow portion 232 may be a hole separately formed in the mounting disc 233, or the hollow portion 232 may be one of multiple through holes 234 covered by the standard zone 231 of the mounting disc 233.

The hollow portion 232 may differ from the through hole 234 in pore size, facilitating recognition of the hollow portion 232 and the through hole 234 by a user.

The mounting disc 233 is provided with the hollow portion 232, so it is not necessary to provide the hollow portion 232 on the standard zone 231. In this way, the risk of abrasion to the standard zone 231 caused by processing of the hollow portion 232 is reduced. In addition, the strength of the standard zone 231 is improved, and the service life of the standard zone 231 is prolonged.

The hollow portion 232 is staggered from the standard zone 231, so that the mounting disc 233 can switch between a calibration state in which the hollow portion 232 is at the measurement position and a measurement state in which the standard zone 231 is at the measurement position. The switching process can be implemented simply by rotating the mounting disc 233 without disassembling the mounting disc 233, thus improving the calibration efficiency.

Figure 9:
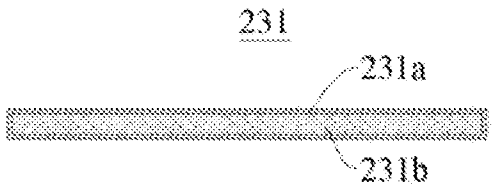
FIG. 9 is a schematic structural diagram of a standard zone according to some embodiments of this application.

According to some embodiments of this application, referring to FIG. 9, FIG. 9 is a schematic structural diagram of a standard zone 231 according to some embodiments of this application. The standard zone 231 includes a coating layer 231*a* and an electrode plate 231*b*. A closed cavity is provided inside the coating layer 231*a*, and the electrode plate 231*b* is located in the closed cavity.

The electrode plate 231*b* may have the same surface density value as an electrode plate 231*b* used in actual production so as to improve calibration accuracy.

The coating layer 231*a* may be made of a film material, and the coating layer 231*a* is wrapped around an outer wall surface of the electrode plate 231*b* such that the coating layer 231*a* forms a closed cavity.

The coating layer 231*a* may alternatively be a coating applied onto the surface of the electrode plate 231*b*.

On one hand, the closed cavity can protect the electrode plate 231*b* to reduce the risk of scratch and damage to the electrode plate 231*b* caused by external objects. On the other hand, the closed cavity can reduce the risk of volatilization of components of the electrode plate 231*b*, making the electrode plate 231*b* reusable. For example, if the electrode plate 231*b* is not placed in the closed cavity, moisture in an active substance layer volatilizes, causing a change in the surface density value of the electrode plate 231*b* and resulting in measurement errors. Therefore, the closed cavity enables the electrode plate 231*b* to be reusable, and the electrode plate 231*b* is consistent with the electrode plate 231*b* used in actual production, improving the calibration accuracy.

According to some embodiments of this application, referring to FIG. 3 and FIG. 4, thicknesses of the multiple standard zones 231 gradually increase in a circumferential direction of the standard member 23.

Because a linear regression equation for the calibration of the surface density device 10 is a unitary linear equation, it is possible to make the measured thickness values of the standard zones 231 gradually increase in the calibration process, reducing the risk of missed measurements.

In the circumferential direction of the standard member 23, the multiple standard zones 231 are arranged with gradually increasing thicknesses. The standard member 23 only needs to rotate along one direction to ensure that the surface density device 10 can measure all standard zones 231 in sequence, improving the calibration efficiency and reducing the risk of missed measurements.

Figure 11:
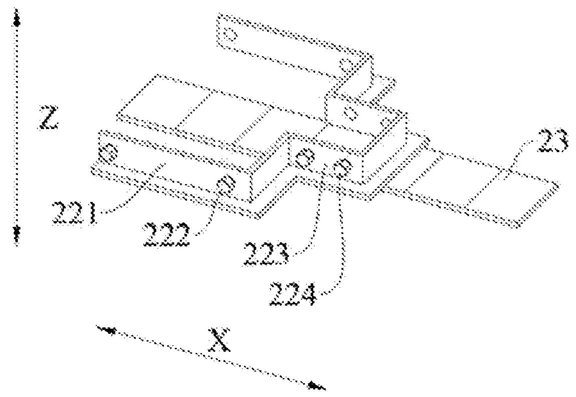
FIG. 11 is a schematic diagram showing fitting between a standard zone and a mounting bracket according to some embodiments of this application.
Figure 12:
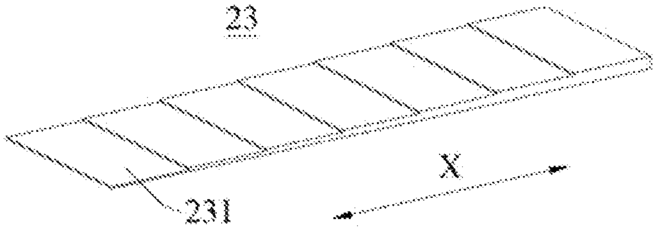
FIG. 12 is a schematic structural diagram of a standard member (multiple standard zones are arranged along a first direction) according to some embodiments of this application.

According to some embodiments of this application, referring to FIG. 11 and FIG. 12, FIG. 11 is a schematic diagram showing fitting between a standard zone 231 and a mounting bracket 22 according to some embodiments of this application, and FIG. 12 is a schematic structural diagram of a standard member 23 (multiple standard zones 231 are arranged along a first direction) according to some embodiments of this application. The standard member 23 is movably disposed on the mounting bracket 22 in the first direction, the multiple standard zones 231 are arranged along the first direction, and the adjusting member 21 is configured to drive the standard member 23 to move along the first direction so as to adjust positions of the multiple standard zones 231 relative to the mounting bracket 22.

The first direction may be the direction indicated by axis X in the figure. In the embodiment where the surface density device 10 includes the emitting member 12 and the detection member 11, the emitting member 12 and the detection member 11 may be arranged along a second direction, where the first direction is perpendicular to the second direction, that is, the second direction may be the direction indicated by axis Z in the figure.

In this embodiment, the multiple standard zones 231 may be integrally formed or may be connected in sequence along the first direction.

The standard zone 231 may be rectangular, and adjacent standard zones 231 may be connected side-to-side (long side to long side, or short side to short side), increasing the connection area between the standard zones 231, thereby improving the connection strength of the standard zones 231.

The adjusting member 21 may include a member having a reciprocally movable end. For example, the adjusting member 21 may include a cylinder or a hydraulic cylinder, where a housing of the cylinder or hydraulic cylinder may be connected to the mounting bracket 22, and a telescopic end of the cylinder is connected to the standard member 23. The adjusting member 21 may further include a crank connecting rod structure. The crank connecting rod structure may include a crank, a connecting rod, and a moving portion. The crank is rotatably connected to the mounting bracket 22. One end of the connecting rod is rotatably connected to the mounting bracket 22, and the other end thereof is rotatably connected to the moving portion. The moving portion is slidably connected to the mounting bracket 22 in a first direction, the standard member 23 is connected to the moving portion, and when the crank rotates, the moving portion can be driven by the connecting rod to reciprocate along the first direction.

The adjusting member 21 may be connected to one end of the standard member 23. For example, in the foregoing embodiment, the telescopic end of the cylinder or hydraulic cylinder may be connected to one end of the standard member 23.

Figure 13:
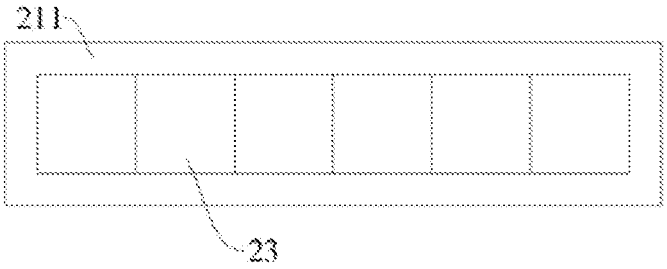
FIG. 13 is a schematic structural top view showing fitting between a support disc and a standard member according to some embodiments of this application.
Figure 14:
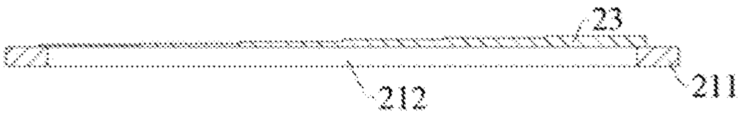
FIG. 14 is a schematic diagram showing arrangement of a measurement hole of a support disc according to some embodiments of this application.

Referring to FIG. 13 and FIG. 14, FIG. 13 is a schematic structural top view showing fitting between a support disc 211 and a standard member 23 according to some embodiments of this application, and FIG. 14 is a schematic diagram showing arrangement of a measurement hole 212 of a support disc 211 according to some embodiments of this application. The adjusting member 21 may be further provided with a support disc 211, the support disc 211 being provided with a measurement hole 212 matching the standard member 23 in shape. The standard member 23 covers the support disc 211 such that a projection of the standard zone 231 on the support disc 211 is located within a range of the measurement hole 212. The measurement hole 212 can prevent the rays from the surface density device 10 from passing through the support disc 211 when passing through the standard zone 231, which otherwise results in measurement errors. In addition, the support disc 211 can support the standard member 23, reducing the risk of bending of the standard member 23.

The standard member 23 is capable of moving relative to the mounting bracket 22 along the first direction, which facilitates adjustment of the position of the standard member 23 relative to the measurement position of the surface density device 10, thereby obtaining a better measurement effect. In addition, the standard member 23 can move away from the measurement position of the surface density device 10, so that the purpose of calibrating the surface density device 10 can be achieved without providing the hollow portion 232 in the standard zone 231, simplifying processing procedures and reducing the risk of inaccurate measurement caused by abrasion to the standard zone 231 due to processing of the standard zone 231.

According to some embodiments of this application, referring to FIG. 12, in the embodiment where the standard member 23 is movably disposed on the mounting bracket 22 in the first direction, the multiple standard zones 231 are integrally formed.

The multiple standard zones 231 may be integrally formed into an elongated structure, facilitating switching of the standard zones 231 at the measurement position of the surface density device 10 when the standard member 23 moves along the first direction.

The multiple standard zones 231 are integrally formed. In this way, the structural strength of the standard member 23 is improved, and the risk of bending or breakage of the standard member 23 during moving along the first direction is reduced. In addition, relative positions between the standard zones 231 are fixed, reducing the risk that the surface density device 10 is unable to accurately measure surface density of the standard zone 231 due to deviation of the standard zone 231 in the process of calibrating the surface density device 10.

According to some embodiments of this application, referring to FIG. 12, the multiple standard zones 231 are continuously provided along the first direction.

The multiple standard zones 231 are arranged in sequence along the first direction, and there is no gap or a minimal gap between adjacent standard zones 231.

When the multiple standard zones 231 are arranged along the first direction, junctions of adjacent standard zones 231 are integrally formed, so that there is no gap between the standard zones 231. Alternatively, the adjacent standard zones 231 may abut against each other tightly, so that only a minimal gap is present between the standard zones 231. The minimal gap refers to a gap smaller than 2 mm between the standard zones 231.

On one hand, the multiple standard zones 231 being continuously provided along the first direction makes the structure of the standard member 23 more compact and reduces length of the standard member 23 in the first direction, thereby reducing the risk of bending of the standard member 23. On the other hand, the multiple standard zones 231 being continuously provided along the first direction shortens the movement distance of the standard member 23 in the calibration process, thereby reducing the time required for calibration and improving the calibration efficiency.

According to some embodiments of this application, referring to FIG. 12, in the embodiment where the multiple standard zones 231 are continuously provided along the first direction, thicknesses of the multiple standard zones 231 gradually increase.

In the embodiment where the adjusting member 21 is connected to one end of the standard member 23, the thickest standard zone 231 in the multiple standard zones 231 may be close to the adjusting member 21 while the thinnest standard zone 231 is away from the adjusting member 21, so as to reduce the risk of bending of the standard member 23.

The multiple standard zones 231 are arranged with gradually increasing thicknesses. In this way, the standard member 23 only needs to move along the first direction to ensure that the surface density device 10 can measure all standard zones 231 in sequence, improving the calibration efficiency.

Figure 10:
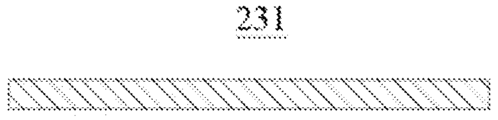
FIG. 10 is a schematic structural diagram of a standard zone according to some other embodiments of this application.

According to some embodiments of this application, referring to FIG. 10, FIG. 10 is a schematic structural diagram of a standard zone 231 according to some other embodiments of this application. The standard zone 231 is made of steel.

The standard zone 231 may be entirely made of steel.

The standard zone 231 may alternatively be partially made of steel. For example, the standard zone 231 may be made of a composite material containing steel.

The surface of the steel may be coated with a coating so as to prolong the service life of the steel. The coating may be an anti-rust coating.

The steel may be stainless steel or aluminum alloy.

The steel has good corrosion resistance and structural strength, so that the standard zone 231 can be reused, thereby prolonging the service life of the standard zone 231.

Figure 15:
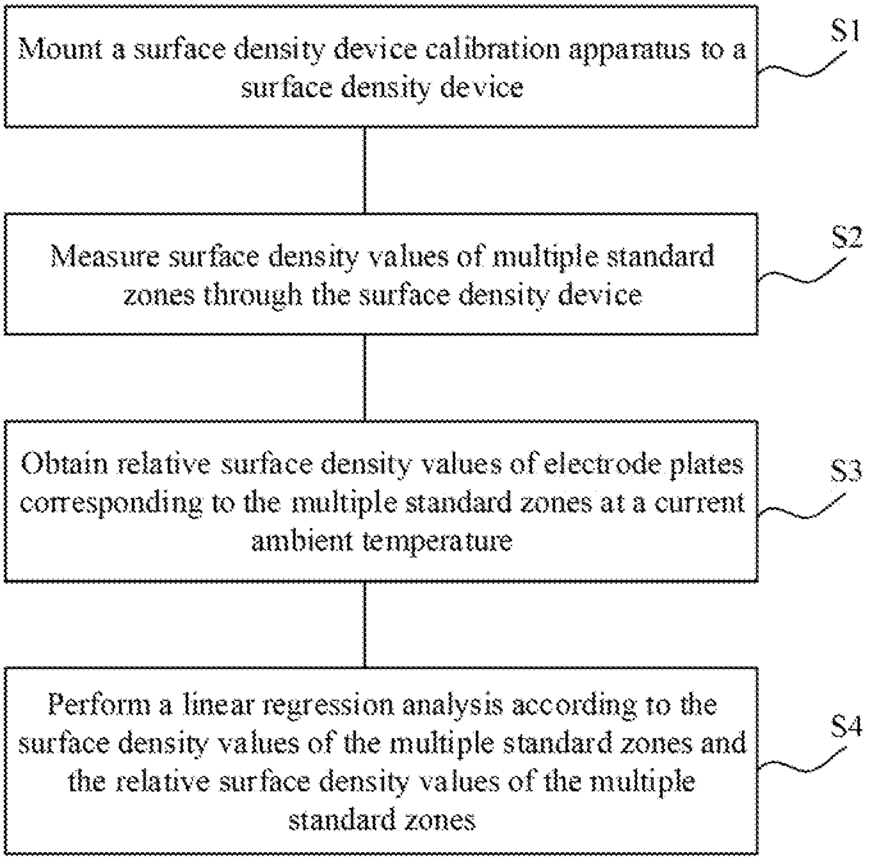
FIG. 15 is a flowchart of a surface density device calibration method according to some embodiments of this application.

According to some embodiments of this application, referring to FIG. 15, an embodiment of this application further provides a surface density device 10 calibration method. The calibration method includes the following steps.

S1: Mount the surface density device 10 calibration apparatus 20 in the foregoing embodiment to a surface density device 10.

In the embodiment where the standard member 23 is rotatably disposed on the mounting bracket 22, during mounting of the calibration apparatus 20, one of the multiple standard zones 231 of the standard member 23 may be provided at a measurement position of the surface density device 10 or the hollow portion 232 of the standard member 23 is disposed at the measurement position, so that different standard zones 231 can move to the measurement position when the standard member 23 rotates.

In the embodiment where the standard member 23 is movably disposed on the mounting bracket 22 in the first direction, during mounting of the calibration apparatus 20, the standard member 23 may be at a distance from the measurement position, allowing rays from the surface density device 10 to pass through air for completing a calibration operation.

If the surface density device 10 includes a housing, and the emitting member 12 and the detection member 11 are both disposed in the housing. Before the calibration apparatus 20 is mounted, a step of opening the housing and moving the calibration apparatus 20 into the housing is further included.

If the separate emitting member 12 and detection member 11 are disposed in the surface density device 10, the calibration apparatus 20 may be mounted on one of the emitting member 12 or the detection member 11.

S2: Measure surface density values of the multiple standard zones 231 through the surface density device 10.

Before surface density of the standard zone 231 is measured, the surface density device 10 may be calibrated first so as to improve measurement accuracy of the surface density device 10. The calibration method is well known to those skilled in the art and is not described herein. The standard member 23 may be further cleaned to reduce the risk of overestimated measurement results caused by impurities in the environment adhering to the standard zone 231.

During measurement, in the embodiment where the standard member 23 is rotatably disposed on the mounting bracket 22, the adjusting member 21 drives the standard member 23 to rotate, and measurement is performed in the order of gradually increasing thicknesses of the standard zones 231. In the embodiment where the standard member 23 is movably disposed on the mounting bracket 22 in the first direction, the adjusting member 21 drives the standard member 23 to move in the first direction, and measurement is performed in the order of gradually increasing thicknesses of the standard zones 231.

During measurement, the measurement may be performed repeatedly to obtain an average of the surface density values of the standard zones 231 so as to improve measurement accuracy. During repeated measurements, measurements can be performed on a same region of the standard zone 231 or on different regions of a same standard zone 231.

S3: Obtain relative surface density values of electrode plates 231*b* corresponding to the multiple standard zones 231 at a current ambient temperature.

A relative surface density value reflects a surface density value of an electrode plate 231*b* corresponding to a standard piece. This value is measured in advance by the surface density device 10 that has been calibrated using the electrode plate 231*b*. In a production process of battery, multiple types of electrode plates 231*b* with different formulations are produced (different formulations lead to different surface density values of the electrode plates 231*b*). Therefore, in a case that the surface density device 10 is calibrated using the electrode plates 231*b* with different formulations, for the standard zones 231 of a same standard member 23, the relative surface density values measured by the calibrated surface density device 10 vary.

The measured relative surface density values may be pre-stored in a data set. Such data set may be a data table, a database, or the like.

S4: Perform a linear regression analysis according to the surface density values of the multiple standard zones 231 and the relative surface density values of the multiple standard zones 231 to calibrate the surface density device 10 through the standard member 23.

Through the linear regression analysis, it is possible to describe a linear relationship between the surface density values and the relative surface density values of the standard zones 231 for surface density measurement, so as to implement the calibration process of the surface density device 10.

A regression equation obtained from the linear regression analysis may be $y=kx+b$, where k denotes a slope, b denotes a constant term, an independent variable x may be the surface density value obtained from the standard zone 231 for surface density measurement, and a dependent variable y may be a relative surface density value.

In this embodiment, the minimum extreme value of a surface density range of the multiple standard zones 231 may be less than the minimum extreme value of a surface density range of the electrode plates 231*b*, and the maximum extreme value of the surface density range of the multiple standard zones 231 may be greater than the maximum extreme value of the surface density range of the electrode plates 231*b*, so that the surface density range of the electrode plates 231*b* falls within the surface density range of the standard zones 231. For example, if the density range of the electrode plates 231*b* is 100 $mg/m^2$ to 200 $mg/m^2$, the density range of the multiple standard zones 231 may be 90 $mg/m^2$ to 210 $mg/m^2$, so as to improve linear regression accuracy.

During the linear regression analysis, a step of obtaining a correlation coefficient of the regression equation is further included. If the correlation coefficient is less than a threshold, the foregoing steps S1 to S4 are repeated.

It should be noted that in the foregoing method, the order of step S2 and step S3 may be adjusted. For example, step S2 may be performed first and then step S3 is performed, or step S3 may be performed first and then step S2 is performed, or step S2 and step S3 may be performed simultaneously.

The standard member 23 is used instead of the conventional electrode plate 231*b* for calibration, and the corresponding relative surface density values of the standard zones 231 are known in advance, so that a weighing process in the conventional calibration process is omitted, improving the calibration efficiency. In addition, one standard member 23 can be used for formulation calibration of multiple types of electrode plates 231*b*, reducing the calibration cost.

According to some embodiments of this application, before the obtaining relative surface density values of electrode plates 231*b* corresponding to the multiple standard zones 231 at a current ambient temperature, the calibration method further includes the following steps.

S5: Calibrate the surface density device 10 through the electrode plate 231*b* at a given ambient temperature.

S6: Measure surface density values of the multiple standard zones 231 through the calibrated surface density device 10 to obtain the relative surface density values of the electrode plates 231*b* corresponding to the multiple standard zones 231 at the current ambient temperature.

For example, Table 1-1 below is a table for recording relative surface density values. In this table, row numbers may be identification numbers of the standard zones 231 of the standard member 23, column numbers may be ambient temperatures during measurement of the standard member 23, and the cells record the relative surface density values corresponding to the standard zones 231 at the ambient temperatures during measurement.

TABLE 1-1

| | Relative surface density value lookup table | | | | | | |
|---|---|---|---|---|---|---|---|
| Temperature | First standard zone | Second standard zone | Third standard zone | Fourth standard zone | Fifth standard zone | Six standard zone | Seventh standard zone |
| T1 | M11 | M12 | M13 | M14 | M15 | M16 | M17 |
| T2 | M21 | M22 | M23 | M24 | M25 | M26 | M27 |
| T3 | M31 | M32 | M33 | M34 | M35 | M36 | M37 |
| T4 | M41 | M42 | M43 | M44 | M45 | M46 | M47 |
| T5 | M51 | M52 | M53 | M54 | M55 | M56 | M57 |

In this embodiment, the ambient temperature remains the same in calibrating the surface density device 10 through the electrode plate 231*b* and in measuring the relative surface density values after calibration.

S7: Change the ambient temperature and repeat the foregoing steps.

During measurement on the multiple standard zones 231, the ambient temperature can be changed after the relative surface density values corresponding to all standard zones 231 have been measured at one ambient temperature.

The surface density device 10 is calibrated through the electrode plate 231*b*, and a surface density value obtained through measurement on the standard zone 231 through the calibrated surface density device 10 is a relative surface density value reflecting surface density of the electrode plate 231*b*, so that the standard zone 231 can replace the electrode plate 231*b* for calibration.

According to some embodiments of this application, step S4 of calibrating the surface density device 10 through the electrode plate 231*b* includes the following steps.

S51: Manufacture multiple electrode plates 231*b* with different surface densities.

In this embodiment, seven electrode plates 231*b* may be provided.

S52: Measure surface density values of the electrode plates 231*b* through the surface density device 10.

S53: Obtain actual surface density values of the electrode plates 231*b*.

S54: Perform a linear regression analysis according to the actual surface density values of the multiple electrode plates 231*b* and the surface density values of the multiple electrode plates 231*b* to calibrate the surface density device 10 through the electrode plates 231*b*.

According to some embodiments of this application, step S53 of obtaining actual surface density values of the multiple electrode plates 231*b* includes the following steps.

S531: Sample the multiple electrode plates 231*b* separately.

During sampling, the electrode plates 231*b* can be punched, punched regions form the samples, and the samples may be circular or rectangular.

S532: Weigh the samples through a weighing device.

S533: Calculate actual surface density values of the electrode plates 231*b* corresponding to the samples based on weights and areas of the samples.

Specifically, a ratio of the weight of the sample to the area of the sample is the actual surface density value.

According to some embodiments of this application, multiple samples are taken from each electrode plate 231*b*, and the actual surface density value of each electrode plate 231*b* is an average of surface density values of the corresponding multiple samples.

Multiple samples are taken from the electrode plate 231*b* and the average of the surface density values of the multiple samples is calculated, reducing the risk of errors in the actual surface density values and improving accuracy in subsequent calibration of the surface density device 10.

According to some embodiments of this application, 6-12 samples are taken from cach electrode plate 231*b*.

According to some embodiments of this application, refer to FIG. 1, FIG. 3, FIG. 11, and FIG. 12. An embodiment of this application provides a surface density device 10 calibration apparatus 20 for calibrating a surface density measurement device. The calibration apparatus 20 includes a mounting bracket 22, a standard member 23, and an adjusting member 21. The mounting bracket 22 is configured for mounting a surface density device 10. The standard member 23 includes multiple standard zones 231 with different densities. The adjusting member 21 connects the standard member 23 and the mounting bracket 22, and the adjusting member 21 is configured to adjust positions of the multiple standard zones 231 such that the multiple standard zones 231 move one by one to a testing position of the surface density device 10.

The multiple standard zones 231 of the standard member 23 are integrally formed.

In some embodiments, the standard member 23 is rotatably disposed on the mounting bracket 22, the standard member 23 is a disc structure, the standard zones 231 are fan-shaped structures, the multiple standard zones 231 are arranged in sequence around a rotation center of the standard member 23, and one of the multiple standard zones 231 is provided with a hollow portion 232.

In some other embodiments, the standard member 23 is movably disposed on the mounting bracket 22 in a first direction, the standard member 23 is an elongated structure, the standard zones 231 are rectangular, and the multiple standard zones 231 are arranged along the first direction.

According to some embodiments of this application, an embodiment of this application further provides a surface density device 10 calibration method. The calibration method includes the following steps.

S1: Disassemble a housing of a surface density device 10 and mount the surface density device 10 calibration apparatus 20 in the foregoing embodiment to the surface density device 10.

S2: Measure surface density values of the multiple standard zones 231 through the surface density device 10, where multiple measurements are performed on each standard zone 231 so as to obtain an average of the surface density values of each standard zone 231.

S3: Obtain relative surface density values of electrode plates 231*b* corresponding to the multiple standard zones 231 at a current ambient temperature.

S4: Perform a linear regression analysis according to the average of the surface density values of the multiple standard zones 231 and the relative surface density values of the multiple standard zones 231 to calibrate the surface density device 10 through the standard member 23.

During the linear regression analysis, a correlation coefficient of a regression equation is obtained. If the correlation coefficient is less than 99.5%, steps S1 to S4 are repeated.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. An apparatus for calibrating a surface density measurement device, comprising:

a mounting bracket configured for mounting the surface density measurement device;

a standard member, comprising multiple standard zones with different densities; and an adjusting member connected to the standard member and the mounting bracket, wherein the mounting bracket comprises a mounting disc for connecting with the adjusting member, wherein the multiple standard zones are provided around an outer side of the mounting disc and the adjusting member is configured to adjust positions of the multiple standard zones, such that the multiple standard zones move one by one to a testing position of the surface density measurement device, wherein the multiple standard zones are integrally formed, and the multiple standard zones are continuously provided along a circumferential direction of the mounting disc.

2. The apparatus according to claim 1, wherein the standard member is rotatably disposed on the mounting bracket, the multiple standard zones are provided around a rotation center of the standard member, and the adjusting member is configured to drive the standard member to rotate relative to the mounting bracket, so as to adjust the positions of the multiple standard zones.

3. The apparatus according to claim 2, wherein one of the multiple standard zones is provided with a hollow portion.

4. A method for calibrating a surface density measurement device, performed by an apparatus that comprises a mounting bracket for mounting the surface density measurement device, a standard member comprising multiple standard zones with different densities, and an adjusting member connected to the standard member and the mounting bracket, wherein the mounting bracket comprises a mounting disc for connecting with the adjusting member, the method comprising:

mounting the surface density measurement device on the mounting bracket:

measuring surface density values of the multiple standard zones using the surface density measurement device;

obtaining relative surface density values of electrode plates corresponding to the multiple standard zones at a current ambient temperature; and performing a linear regression analysis according to the surface density values of the multiple standard zones and the relative surface density values of the electrode plates corresponding to the multiple standard zones, to calibrate the surface density measurement device through the standard member.

5. The method according to claim 4, wherein before obtaining the relative surface density values of electrode plates corresponding to the multiple standard zones at the current ambient temperature, the method further comprises:

calibrating the surface density measurement device through the electrode plates at a given ambient temperature;

measuring surface density values of the multiple standard zones through the calibrated surface density measurement device to obtain the relative surface density values of the electrode plates corresponding to the multiple standard zones at the current ambient temperature; and changing the ambient temperature and repeating the foregoing steps.

6. The method according to claim 5, wherein calibrating the surface density measurement device through the electrode plates at the given ambient temperature comprises:

manufacturing multiple electrode plates with different surface densities;

measuring surface density values of the electrode plates through the surface density measurement device;

obtaining actual surface density values of the electrode plates; and performing a linear regression analysis according to the actual surface density values of the multiple electrode plates and the measured surface density values of the multiple electrode plates, to calibrate the surface density measurement device through the electrode plates;

wherein obtaining actual surface density values of the multiple electrode plates comprises:

sampling the multiple electrode plates separately;

weighing samples through a weighing device; and calculating the actual surface density values of the electrode plates corresponding to the samples based on weights and areas of the samples.

7. The method according to claim 6, wherein multiple samples are taken from each electrode plate, and the actual surface density value of each electrode plate is an average of surface density values of the corresponding multiple samples; and wherein 6-12 samples are taken from each electrode plate.

8. An apparatus for calibrating a surface density measurement device, comprising:

a mounting bracket configured for mounting the surface density measurement device;

a standard member, comprising multiple standard zones with different surface densities; and an adjusting member connected to the standard member and the mounting bracket, wherein the adjusting member is configured to adjust positions of the multiple standard zones, such that the multiple standard zones move one by one to a testing position of the surface density measurement device, wherein the standard member is movably disposed on the mounting bracket in a first direction, the multiple standard zones are arranged along the first direction, and the adjusting member is configured to drive the standard member to move along the first direction, so as to adjust the positions of the multiple standard zones relative to the mounting bracket, wherein the multiple standard zones are integrally formed and are continuously provided along the first direction, and wherein the first direction is a linear direction.

9. The apparatus according to claim 8, wherein thicknesses of the multiple standard zones gradually increase in the first direction; and the standard zones are made of steel.

* * * * *